US005380434A

United States Patent [19]
Paschedag

[11] Patent Number: 5,380,434
[45] Date of Patent: Jan. 10, 1995

[54] CENTRIFUGE SCROLL WITH ABRASION RESISTANT INSERTS

[75] Inventor: Thomas B. Paschedag, Cincinnati, Ohio

[73] Assignee: Tema Systems, Inc., Cincinnati, Ohio

[21] Appl. No.: 95,096

[22] Filed: Jul. 21, 1993

[51] Int. Cl.$^6$ ............................................. B01D 33/06
[52] U.S. Cl. .................... 210/360.2; 210/360.1; 210/373; 210/380.1; 210/380.3; 494/37
[58] Field of Search ................. 210/360.1, 360.2, 363, 210/370, 371, 380.1, 380.3; 494/53, 54, 81, 37

[56] References Cited

U.S. PATENT DOCUMENTS

| 3,764,062 | 10/1973 | Brautigam | 494/54 |
| 4,328,925 | 5/1982 | Shapiro | 494/81 |
| 4,983,289 | 1/1991 | Salomon | 210/380.1 |

OTHER PUBLICATIONS

Not dated Brochure entitled "Tema Siebtechnik, The Original Designers, Conturbex Fine Coal Centrifuge" by Tema Systems, Inc.
1991 Brochure entitled "Centrifuges" by Tema Systems, Inc.

*Primary Examiner*—Robert A. Dawson
*Assistant Examiner*—David Reifsnyder
*Attorney, Agent, or Firm*—Wood, Herron & Evans

[57] ABSTRACT

A scroll and screen centrifuge especially suited for processing abrasive materials in which the surfaces of the screw flights on the scroll members contain recessed abrasion resistant shields. The abrasion resistant shields have an upper exposed surface flush with the front surfaces of the screw flights. The scroll members also have feed openings designed for material flow which further reduces the abrasion of the scroll member.

14 Claims, 2 Drawing Sheets

CENTRIFUGE SCROLL WITH ABRASION RESISTANT INSERTS

BACKGROUND OF THE INVENTION

1. Field of the Invention

The present invention relates generally to the area of fluid handling and solid/liquid separation and, more particularly, to a scroll and screen centrifuge having abrasion resistant scroll inserts and feed openings designed to reduce abrasion of the scroll.

2. Description of Related Art

It is well known to use a scroll and screen centrifuge to separate a crystalline, a granular or a fibrous product from a liquid in which the crystalline, granular or fibrous product is carried. Scroll and screen centrifuges are typically used with a continuous process in which a combined liquid and solid material is continuously fed into and continuously discharged from the centrifuge. The continuous process is distinguished from a batch process in which a batch of the liquid and solid material is fed into the centrifuge; and the liquid and solid materials are separated. The centrifuge is stopped, and the separated materials are removed before another batch is loaded into the centrifuge. Both the continuous and batch separation processes are also considered to dry the solid material. The separation process is used in a wide range of applications including the production of soap powders, coal, gypsum, plastic granules, potash, salt, etc.

In a typical scroll and screen centrifuge, a frustoconical scroll and cage assembly is mounted for rotation within a housing. A frustoconical scroll member having a tubular side wall with outwardly projecting helical screw flights is mounted for rotation within an independently rotating frustoconical screen cage, and a screen basket is mounted within the screen cage. The scroll member and cage member rotate at a slightly different angular velocities so that the helical screw flights on the scroll member pass close to and over an inner directed surface of the screen. The helical length of the screw flights varies in a range of from a fraction of a revolution to several revolutions around the scroll member. A liquid containing solids to be separated is fed into a closed rearward portion of the frustoconical scroll and cage assembly. The rotation of the screen cage produces a centrifugal force causing the liquid to pass through openings in the screen basket thereby separating the liquid from the solids. The rotational velocity difference between the scroll member and cage member causes the screw flights to push the solid material across the screen from the smaller, closed, rear end of the scroll and cage assembly to its larger, open, forward end from which the solid material is discharged. The processing time or retention time of the material in the centrifuge is controlled by the pitch of the helical screw flights on the scroll member and the difference in angular velocities between the scroll and cage members. Retention time is also influenced by the design of the feed openings in the scroll. Gravity pulls the solid particles through the plenum to another processing station, a conveyor or a collection unit.

The most vigorous interaction between the combined liquid and solid material occurs at the smaller, closed end of the scroll and cage assembly. At that point, the combined liquid and solid material passes from the interior of the scroll member through feed openings in the tubular side wall to a volume bounded by the end wall of the scroll member, the outer surface of the tubular side wall of the scroll member, the helical screw flights extending from the scroll member and the screen. As the combined liquid and solid material passes through the feed openings, it contacts the screw flights over their full width, which extends from the outer surface of the tubular side wall of the scroll member to the screen; and the combined liquid and solid material contact the screw flights over a significant portion of their length. In some applications, for example, the separation of coal from a coal and water slurry, the physical characteristics of the coal and slurry water, are such that vigorous contact of the coal slurry with the screw flights will result in the structural material of the screw flights being abraded away.

The rotation of the scroll and cage assembly is effective to quickly separate the liquid from the solid material after a translation of the combined liquid and solid material from the smaller, closed end of the scroll and cage assembly toward the larger, open discharge end. In a coal slurry, the greatest wear occurs at the feed area where the slurry impacts on the rotating scroll. In addition to the impact, the acceleration of the solids from a static state to a rotating state produces high abrasion. Motion of the solid material toward the discharge end is controlled by the difference in angular velocities between the scroll member and the screen cage. The abrading action is lower at the discharge end because the relative velocities of the rotating components and the coal is less vigorous.

The extent and severity of the abrading action will depend on the physical characteristics, that is, the abrasion characteristics of the combined liquid and solid material, the design of the scroll and cage assembly and the operating parameters of the centrifuge. To reduce the wear and tear by the solid material on the screw flights of the scroll member, abrasion resistant elements comprising abrasion resistant tiles are bonded on top of the forward directed surfaces of the screw flights proximate the rear end of the scroll member. However, the bonding agent in the joints between the tiles and in the joints between the underside of the tiles and the surfaces of the screw flights projects above the surface of the screw flight and is subject to the same abrading action by the solid material. Consequently, the bonding agent experiences the same wear and tear from the abrading action of the solid material and is abraded away. Therefore, scroll members with such abrasion resistant elements have the disadvantage of that after a short period of use, for example, several months, the combined liquid and solid material abrades away the bonding agent in the joints between and below the tiles; and the tiles become separated from the top surfaces of the screw flights. Therefore, the useful life of the scroll member is shortened, and the centrifuge must be rebuilt with a replacement scroll member at a substantial expense.

The designs of prior scroll members have feed openings with lips adjacent the end wall that trap solids inside the scroll member. The trapped solids move in circular paths inside the scroll member and undercut the lip and abrade the adjacent end wall. Therefore, such designs have the disadvantage of having unnecessary abrasion and wear and tear on the scroll and cage assembly, thereby reducing its useful life.

SUMMARY OF THE INVENTION

To overcome the disadvantages described above, the present invention provides a scroll and cage assembly in which the abrasion resistant inserts or shields are recessed within the screw flights of the scroll member and are protected from much of the abrasive action of the combined liquid and solid material. Therefore, the invention is especially suited for use in those applications such as, for example, the coal industry, in which the scroll and screen centrifuge processes an abrasive liquid and solid material, such as, a coal slurry.

According to the principles of the present invention, and in accordance with the described embodiments, a scroll and screen centrifuge comprises a scroll and cage assembly having a scroll member designed to optimize the flow of the combined liquid and solid material through the scroll and cage assembly. The forward directed surfaces of the screw flights have been recessed to receive the abrasion resistant inserts such that the upper exposed surfaces of the abrasion resistant inserts are flush with the surfaces of the screw flights in which the abrasion resistant inserts are mounted. Further, the size and position of the feed openings have been changed to promote better flow through the scroll to more fully utilize the area of the screen and to reduce circular flow patterns inside the tubular wall section of the scroll member. More particularly, the rear edge of the feed openings is flush with the forward directed surface of the end wall of the scroll member. The lower edge of the feed openings is displaced above the forward surface of the screw flights to form a wear lip therebetween which prevents undercutting of the abrasion resistant inserts by the coal slurry.

The constructions of the present invention have the advantages of improving the flow path of material through the centrifuge to reduce abrasion of the scroll member and providing abrasion resistant screw flight surfaces that are less subject to the abrading action of the combined liquid and solid material. Therefore, the present invention has the further advantages of providing a scroll member with a longer life thereby reducing maintenance and downtime and the cost of operating a scroll and screen centrifuge in those applications where an abrading solid material increases the wear and tear on the scroll member.

These and other objects and advantages of the present invention will become more readily apparent during the following detailed description together with the drawings herein.

DETAILED DESCRIPTION OF THE INVENTION

Figure 1:
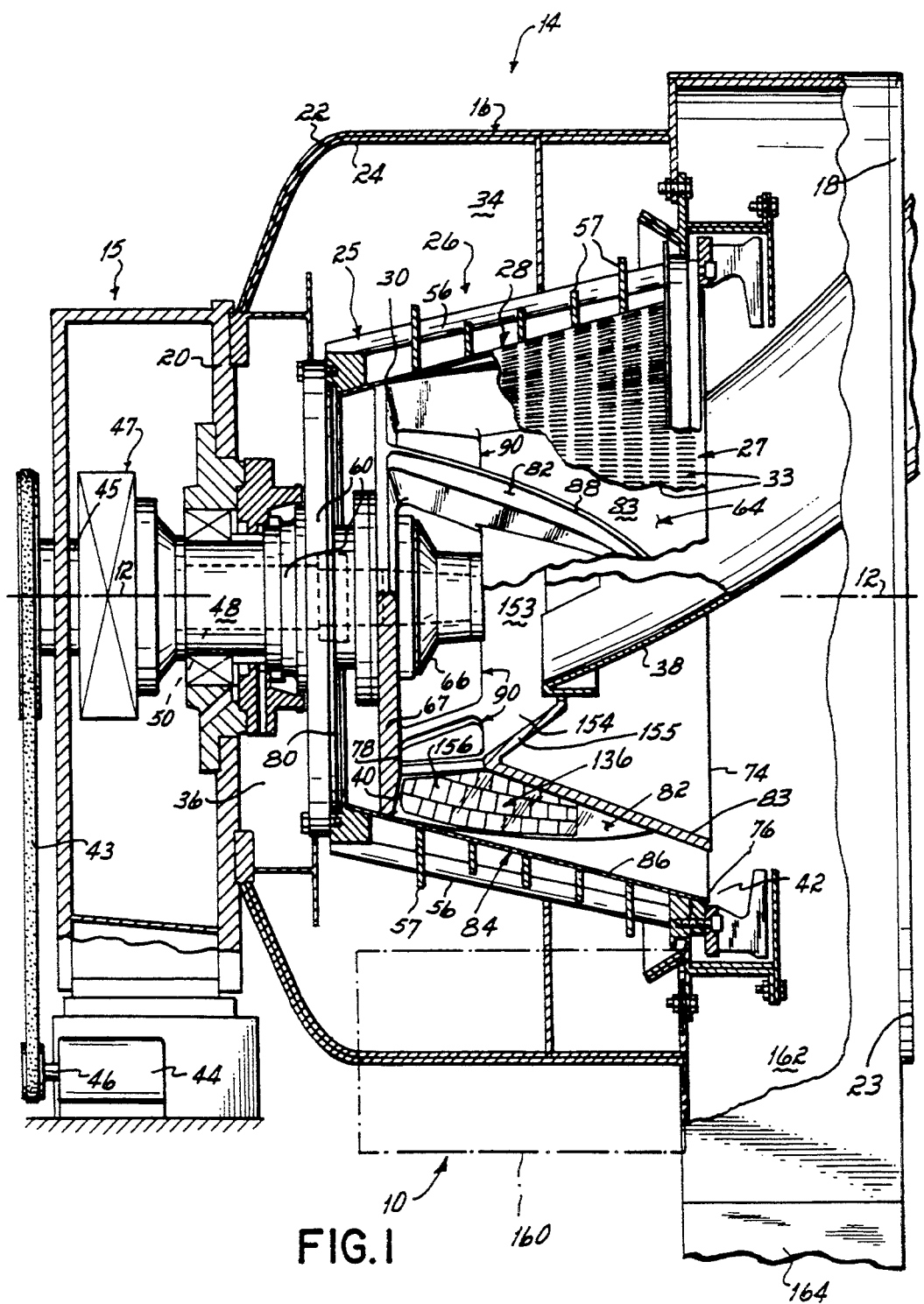
FIG. 1 is an axial cross-section view partially in elevation and illustrating the basic component parts of a scroll and screen centrifuge.

Referring to FIG. 1, the illustrated centrifuge 10 is a horizontal machine in that the rotating components turn about a horizontal axis of rotation 12. The centrifuge is comprised of a discharge housing 14 mounted to a drive housing 15. The discharge housing 14 has an exterior wall 16 that includes a front wall 18, and a peripheral wall 22 located between the front wall and an end wall 20 of the base housing 15. The front wall 18 of the discharge housing 14 includes a cover 23 permitting access to the interior of the centrifuge. Further, the exterior wall 16 has an interior surface 24 bounding the contained volume of the discharge housing 14.

A scroll and cage assembly 26 is connected to a multiple shaft drive 47 which is rotatably mounted to the drive housing 15. The scroll and cage assembly 26 includes a screen cage 25 in which is mounted a screen basket 27 with an outer wall 28 consisting of a circumferential screen 30 and hub 60. The screen basket 27 has axially directed slots 33 extending through the circumferential screen 30. The combined liquid and solid material is fed into the centrifuge 10 through a feed pipe 38 to a wet, or feed, end 40 of the scroll and cage assembly 26. Rotation of the scroll and cage assembly 26 results in liquid being discharged through the outer wall 28 into the enclosure 34 and the solid material being discharged from the dry, or discharge, end 42 of the scroll and cage assembly 26.

The centrifuge is powered by a motor 44 that is mechanically coupled by a belt 43 extending between a rotating output shaft 46 to an input shaft 45 of the multiple shaft drive 47. The input shaft 45 is connected to internal gearing that produces a first rotary drive by driving the outer cage drive shaft 48 at a first angular velocity. The multiple shaft drive 47 provides a second rotary drive via internal gearing to drive the inner scroll drive shaft 50 at a second velocity. The second velocity is greater than the first velocity by an amount determined by the gear ratio within the multiple shaft drive 47. The inner scroll drive shaft 50 is rotatably mounted within the outer cage drive shaft 48, and the outer and inner drive shafts 48, 50 are concentrically located about the axis of rotation 12. Consequently, the motor 44 and multiple shaft drive 47 are effective to provide independent rotary drives that have different angular velocities.

The cage 25 is fabricated from a plurality of rods 56 rigidly connected to a plurality of rings 57 to form a generally frustoconical structure for receiving the screen basket 27. The cage 25 has a hub 60 that is centrally located within and bolted to the rear of the cage 25 and is mechanically connected to the outer drive shaft 48. Therefore, screen cage 25 is mounted to rotate within discharge housing 14 about the axis of rotation 12. A scroll member 64 has a hub 66 which is centrally located within and bolted to the end wall 67 of the scroll member 64 and is connected to the inner drive 50. The scroll member 64 has an open front end 74 adjacent an open end 76 of the screen cage 25. The end wall 67 has a front surface 78 forming a closed rear end adjacent a closed end 80 of the cage member 25.

Referring to FIG. 1, with prior designs, the tubular side wall 83 has a constant inward 15° taper with respect to the scroll length that extends the full distance to the end wall 67 of the scroll 64. Therefore, as coal slurry is fed down the inside surface of the baffle plate 155, it is moving toward the circumferential edge of the scroll. However, when the slurry reaches the intersection of the baffle plate 155 and the tubular side wall 83, the 15° taper of the side wall directs the slurry not passing through the feed holes toward the center of the scroll.

With the present invention, the frustum shaped tubular side wall 83 of the scroll member 64 has an initial inward 20° taper with respect to the scroll length. However, at the intersection of the tubular side wall 83 with the baffle 155, the tubular side wall 83 flares outwardly at 5° with respect to the scroll length. Consequently, slurry moving outwardly through the baffle 155 which does not pass through the feed holes 90 continues to be directed outwardly by the 5° flaring of the tubular side wall 83. That change in slope of the tubular side wall provides an improved flow pattern within the feed area of the scroll which directs the slurry into initial contact with the screen at a point closer to the end wall 67 and further from the discharge location. Therefore, the entire area of the screen is more fully utilized.

Screw flights 82 extend generally radially and outwardly from a tubular side wall 83 of scroll member 64 connected to the end wall 67, and the screw flights extend helically about the axis of rotation 12 between the front and rear ends of the scroll member 64. The illustrated scroll member 64 has eight equally spaced screw flights having lengths extending one-eighth of a turn around the tubular wall 83. Each of the screw flights 82 has a peripheral leading edge 88 which, upon rotation of the scroll member, moves in close proximity to and relative to an inner surface 86 of the screen 27. The leading edges 88 of the screw flights 82 of the scroll member 64 are machined so that their shape more closely mates with the shape of the inner surface 86 of the screen 27, Preferably, there is a clearance of approximately 1.0 mm to 1.5 mm between the leading edges 88 of the screw flights 82 and the inner surface 86 of the screen 27. The screen 27 has a frustoconical shape, and the leading edges 88 of the helical screw flights 82 define a mating frustoconical shape. Therefore, rotation of the scroll member 64 causes peripheral edges 88 to sweep a boundary of a frustoconical volume mating with the frustoconical shape of the circumferential screen 30.

Figures 2, 4:
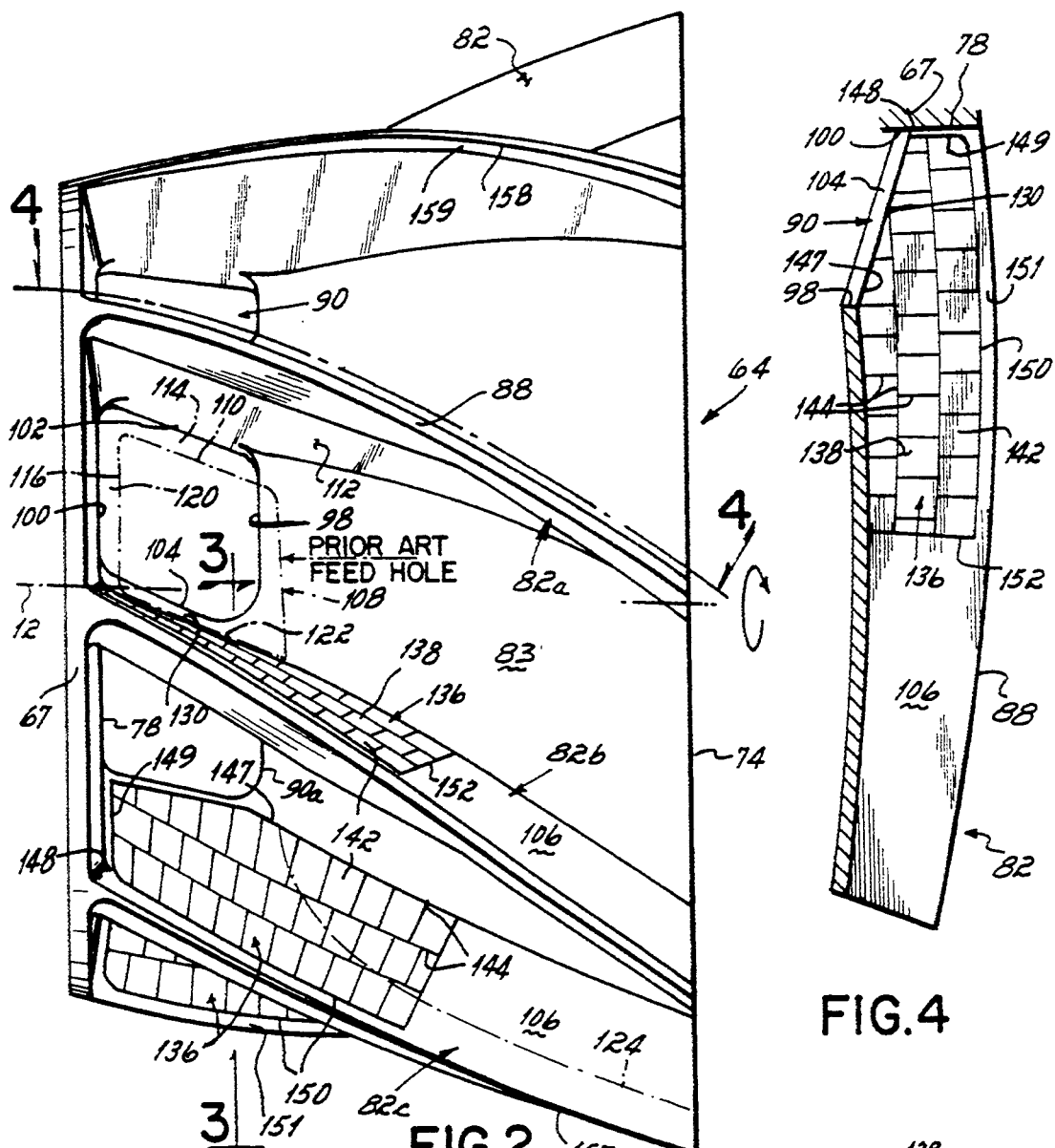
FIG. 2 is a side elevation view of a scroll member utilizing the recessed abrasion resistant inserts.
FIG. 4 is a cross-sectional view taken along lines 4—4 of FIG. 2 and illustrate a top view of the abrasion shield.
Figure 3:
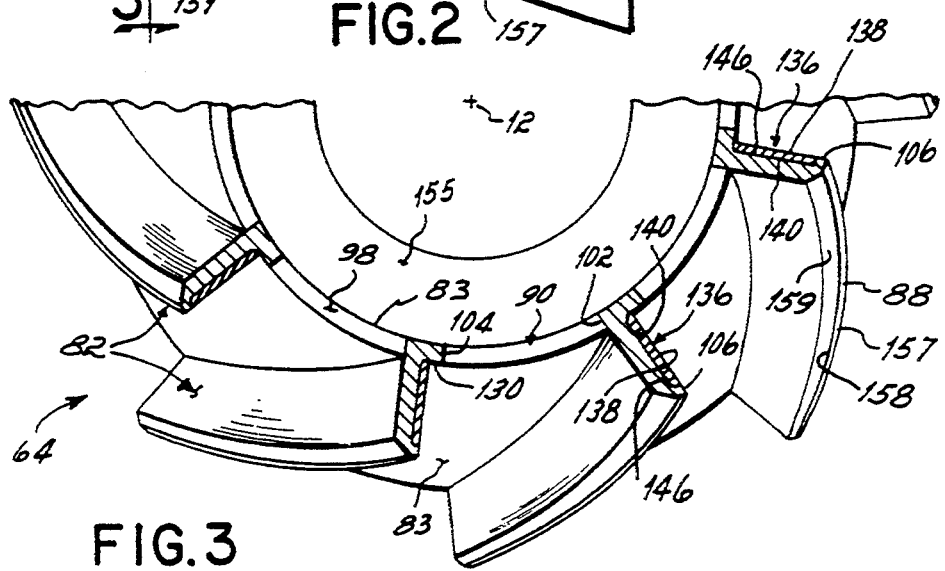
FIG. 3 is a cross-sectional view taken along lines 3—3 of FIG. 2 and illustrates a rear view of the recessed areas of the screw flights.

Referring to FIGS. 2 and 3, a plurality of helical screw flights 82 extend between the larger open end 74 and the end wall 67 at the smaller closed end of the scroll member 64. A first group of circumferential openings or feed openings 90 are located adjacent to the end wall 67 and extend between the screw flights 82. Each of the feed holes 90 includes a front edge 98, a back edge 100, and relative to the clockwise rotation as viewed from the front end 74 of the scroll member 64, a leading edge 102 proximate a leading screw flight 82a and a trailing edge 104 proximate a trailing screw flight 82b. Front surfaces 106 of the screw flights 82 are adjacent the trailing edges 104 of the feed holes 90, are substantially perpendicular to the axis of rotation 12 and are generally directed toward the front side 74 of the scroll member 64.

Referring to FIG. 2, a feed hole 108 shown in phantom illustrates the design of prior scroll members used for processing a coal slurry. The feed hole 108 is located such that it has a leading edge 110 displaced from the rearward surface 112 of the leading screw flight 82a. That displacement forms a lip 114 in the tubular side wall 83 of the scroll member 64 between the leading edge I 10 and the rearward surface 112 of the screw flight 82a. Further, the back edge 116 of the feed hole 108 is displaced from the front surface 78 of the end wall 67 of the scroll member 64 thereby forming a lip 120 in the tubular side wall 83. The lip 120 traps the coal slurry between it and the end wall 67, and the relative circular motion between the scroll member 64 and the trapped coal slurry will abrade the end wall 67 and undercut the lip 120. The trailing edge 122 of the feed hole 108 is flush with the front surface 106 of the trailing screw flight 82b relative to the feed hole 108.

The functional area of the front surface 106 of the screw flights 82 which is primarily used in the processing of the coal slurry extends from the edge 88 to the phantom line 124 shown on the front surface 106 of screw flight 82c. The clockwise rotation of the scroll member 64 as viewed from the front side 74, causes an area of the front surface 106 of the trailing screw flight 82b that is immediately adjacent the feed opening 108 to experience the harshest contact with the coal slurry and be most subject to the impact and abrading action from the coal slurry. The junction between the trailing edge 122 of the feed hole 108 and the front surface 106 of the trailing screw flight 82b will experience the most severe impact and abrasion from the coal slurry. Further, the flush relationship between the trailing edge 122 of the feed hole 108 and the front surface 106 of the trailing screw flight 82b does not effectively protect the scroll member 64 from the harshest impact and abrasive action.

The new orientation of the feed holes 90 relative to the end wall 67 and the screw flights 82 improves the performance of the scroll member 64 in the processing of abrasive combined liquid and solid materials such as a coal slurry. The incoming coal slurry is directed toward the intersection of the tubular side wall 83 and the end wall 67. The removal of the lip 120 provides a flush relationship between the rear edges 100 of the feed holes 90 the front surface 78 of the end wall 67, and therefor, coal slurry is not trapped in the corner of the scroll member 64 between the end wall 67 and the tubular side wall 83. The result is a smoother flow of the coal slurry through the feed holes 90 with less abrasion of the end wall 67.

Further, the trailing edge 104 is displaced from the front surface 106 of the trailing screw flight 82b, thereby creating a lip 130 in the tubular side wall 83. The lip 130 is located at the point of harshest impact and greatest abrasion from the coal slurry. The lip 130 provides an area that is designed to wear from the impact and abrasion and to inhibit the abrasion of other areas of the scroll member, in particular, undercutting of the abrasion resistant inserts. Abrasion of the lip does not affect the performance of the centrifuge and provides longer life to the scroll member 64. The lip 130 extends circumferentially from the front surface 106 and has a lip height in the range of from 9.5 mm to 19 mm; and preferably, the lip height is 13 mm. The leading edge 102 of the feed hole 90 is flush with the rear surface 112 of the leading screw flight 82a to promote the flow of the coal slurry to the rearward most portion of the screw flights 82 and the screen 27, thereby making maximum usage of the full screen area.

In order to protect the front surface 106 of the screw flights 82, an abrasion resistant insert, or abrasion shield, 136 is mounted within the front surface 106 such that the exposed upper surface 138 of each of the abrasion shield 136 is flush with the front surface 106 of the screw flights 82. To better secure the abrasion shield into the screw flights 82, as shown in the cross-sectional view of FIG. 3, each of the screw flights 82 contains a recess or pocket 140 for receiving the abrasion shield 136. Each of the abrasion shields 136 consists of a plurality of abrasion resistant inserts, such as, tiles 142 which are bonded to each other and to the surfaces of the pocket 140. The abrasion resistant tiles 142 are typically made from a ceramic alumina material which is formed into a 25 mm square tile which is 6 mm thick. Preferably, the tiles have a nominal alumina content in the range of from 87% to 95% and are commercially available from Ferro Corp. of East Liverpool, Ohio. The tiles 142 are bonded together within the pocket 140 by filling the joints 144 between the side edges of the tiles and the joints 146 between the bottom surfaces of the tiles and the surfaces of the pockets 140 with a bonding agent, such as, a two part epoxy or glue. Mounting the tiles 142 into the pockets 140 within the front surfaces 106 of the screw flights 82 minimizes the exposure of the bonding agent in the joints to the abrading action of the combined liquid and solid material passing through the feed openings 90.

The exact shape of the abrasion shield 136 and its orientation relative to the front surface 106 and pocket 140 is a matter of design choice. For example, preferably the top surface 138 of the abrasion shield 136 is flush with the front surface 106 of the screw flights 82. Typically, the pocket 140 is manufactured to a depth in excess of the thickness of the tiles 142, and the flush relationship is achieved by filling the pocket 140 with the bonding agent. As shown in FIG. 4, the shape of the abrasion shield closely follows the intersection between the front surface 106 of the screw flights 82 with the tubular side wall 83. Typically, an inner edge 147 of the abrasion shield extends up to the edge of a fillet 148 that is manufactured into the corner of that intersection to improve strength and facilitate the flow of the combined liquid and solid material. The rear edge 149 of the abrasion shield 136 extends up to the edge of the fillet 148 or the forward directed surface of the end wall 67. The outer edge 150 of the abrasion shield 136 extends out close to the leading edge 88 of the screw flight 82. The size of the strip 151 of the outer surface 106 between the leading edge 88 and the outer edge 150 of the abrasion shield 136 is a matter of design choice. The decision is influenced by the extent that the pockets 140 weaken the screw flights in the area of strip 151. The front edge 152 of the abrasive shield 136 extends approximately 50% up the length of the front surface 106 of the screw flights 82.

In use, for example, in the application of separating coal from a coal slurry, the motor 44 drives the scroll and cage assembly in a clockwise direction as viewed from the front of the centrifuge. In coarse coal separation applications, the screen and scroll assembly is designed to separate coal ranging in size from approximately 6 mm to a 28 mesh. In those applications, with an eight flight, one-eighth pitch scroll member, the cage member is rotating at approximately 700 rpm; and the scroll member is rotating at approximately 712 rpm. The centrifuge 10 will provide coal with a surface moisture of approximately 5%. In fine coal separation applications, the screen and scroll assembly is designed to separate coal having a size of less than 28 mesh × 100 mesh. In those applications, with an eight flight, one-eighth pitch scroll member, the cage member is rotating at approximately 1000 rpm; and the scroll member is rotating at approximately 1017 rpm. The centrifuge 10 will provide coal with a surface moisture of approximately 10%.

Referring to FIG. 1, the coal slurry is continuously fed into the centrifuge 10 through feed pipe 38. The feed pipe 38 directs the coal slurry to the central portion 153 of the rotating scroll member 64 which provides a flow path or channel 154 formed between a baffle 155 and the hub 66. The feed openings 90 port the coal slurry from the flow channel 154 in the central portion 153 of the scroll member 64 into a volume 156 bounded by the end wall 67, the tubular side wall 83 and the screw flights 82 of the scroll member 64 and the inner surface 86 of the screen 27. The screw flights 82 are effective to control motion of the coal slurry along the axis of rotation 12. The angular velocity of the scroll and cage assembly 26 creates centrifugal forces which cause the water to pass through the slots, or openings, 33 of the screen 27, and into the enclosure 34. Approximately 90% of the water passes through the screen 27 over the first 50% of the length of the screw flights 82 in moving from the closed end 80 to the open end 76 of the cage member 25.

The angular velocity of the rotating scroll member 64 is faster than the angular velocity of the cage member 56. The difference in angular velocities between the scroll member 64 and cage member 25 is effective to cause the separated coal and other separated solids to move along the leading edge 88 of the screw flights 82 and across the inner surface 86 of the screen 27 toward the open end 76 of the cage member 25. The leading edge 88 of the screw flights 82 defines one side of a peripheral surface 157 of the screw flights 82. The trailing edge 158 of the peripheral surface 157 of the screw flights 82 defines one side of a chamfered surface 159 which is chamfered at 45° to the peripheral surface 157. The chamfered surface 159 effectively narrows the peripheral surface 157 and reduces the amount of coal and other separated solids in the slurry crushed between the peripheral surface 157 and the screen 27. The coal and separated solids which are so crushed are reduced to a fine powder which clogs the perforations 85 in the screen 27 thereby reducing the efficiency of the separation process. Therefore, reducing the area of the peripheral surface 157 and machining the peripheral surface 157 to match the frustoconical shape of the inner surface 86 of the screen 27 reduces the gap therebetween and reduces the amount of solids crushed by the scroll member, thereby improving the efficiency and performance of the centrifuge.

The water that is pushed through the rotating cage member 25 into the enclosure 34 is moved by wind and turbulence created by the rotating cage into a collection unit 160. The coal is discharged at the dry end 42 of the rotating scroll and cage assembly 26 and collected in plenum 162. The coal is pulled by gravity into a collection unit 164 at the bottom of the centrifuge 10.

While the invention has been set forth by the description of the embodiments in considerable detail, it is not intended to restrict or in any way limit the claims to such detail. Additional advantages and modifications will readily appear to those who are skilled in the art. For example, the top surface 138 of the tiles 136 may be slightly above or slightly below the forward surface 106 of the screw flights 82. The abrasion shield may have a width that is short of the intersection of the front surface 106 of the screw flights 82 and the tubular side wall 83 and, for example, is only two-thirds of the width of the screw flight. Further, the abrasion shield may have a shape that more closely corresponds to the actual area of the screw flights that is subject to abrasion. The length of the shield may be longer or shorter as the application requires. The tiles are described as one inch squares; however, the tiles may be other sizes as well.

Preferably, the abrasion shield is a single piece of material so that there are no joints 144 exposed to the abrasive action of the coal slurry. However, the curved profile of the screw flight, the brittle nature of the alumina silica and the high expense of custom manufacturing such a shield makes it less practical for commercial purposes. Alternatively, larger tiles may be used to minimize the number of joints 144. In addition, other materials may be used to produce the abrasive shield such as other ceramics or carbides.

In addition, the size of the feed holes 90 may be larger, smaller or a different geometry depending on the application. The scroll member 64 disclosed herein has eight helical screw flights 82 with a pitch of one-eighth of a turn and processes the coal in approximately 0.5 second. In other coal slurry applications, the helical screw flights may have a pitch of 1.25 turns which will increase the processing time to approximately five seconds. With the longer processing time, it may be desirable to provide additional washing of the separated coal, and therefore, the scroll member 64 would contain a second group of circumferential openings approximately at the midpoint of the scroll member. A nozzle inserted within the scroll member 64 would spray water or other cleaning liquid through the second group of circumferential openings to clean or unclog the screen basket 27.

The frustoconical scroll and cage assembly requires that the peripheral edges 88 of the screw flights 82 and the interior surface 86 of the screen 27 have a desired mating frustoconical shape. However, the outer wall 28 of the cage member 25 and the tubular side wall 83 of the scroll member 64 may have the same or different frustoconical shapes or other shapes, such as a cylindrical shape, that is consistent with the operation of the scroll and screen centrifuge. The frustoconical shape of the scroll and screen assembly may vary in pitch with respect to its length, and the relative diameters of the open and closed ends may also be varied. Alternatively, a cylindrical scroll and cage assembly may be used in which the interior surface 86 of the screen 27 and the peripheral leading edges 88 of the screw flights 82 have a frustoconical shape.

The multiple shaft drive 47 may be driven at different speeds by independent input shafts connected to multiple pulleys or gears mounted on the output drive shaft 46 of the motor 44. Further, the scroll and cage assembly 26 is preferably oriented to rotate about a horizontal axis of rotation, however, the scroll and cage assembly may be constructed to rotate about a vertical axis of rotation. The invention in its broadest aspects is therefore not limited to the specific details shown and described. Accordingly, departures may be made from such details without departing from the spirit or scope of the general inventive concept.

What is claimed is:

1. A centrifuge for processing an abrasive liquid and solid material to separate the liquid from the solid material comprising:
   a housing;
   a cage member having an open end and a closed end and mounted within said housing to rotate about an axis of rotation, said cage member having a circumferential screen with an inner surface; and
   a scroll member mounted within said cage member to rotate about said axis of rotation relative to said cage member, said scroll member receiving the combined liquid and solid material in a central portion and having
      a tubular side wall with a front end and a rear end adjacent said open and closed ends, respectively, of said cage member,
      a helical screw flight extending outwardly from said tubular side wall between said rear end and said front end of said scroll member, said screw flight having an edge moving in close proximity and relative to said inner surface of said circumferential screen, and said screw flight further having a front surface substantially perpendicular to said axis of rotation,
      an end wall at the rear end of the tubular side wall and connected with one end of the screw flight,
      said tubular side wall further having a feed opening proximate said end wall and displaced above said front surface of said helical screw flight to form a lip between an edge of the feed opening and said front surface of said helical screw flight, and
      an abrasion resistant insert recessed in said front surface of said screw flight, said abrasion resistant insert having an exposed surface substantially flush with said front surface of said screw flight.

2. The centrifuge of claim 1 wherein said circumferential screen has a frustoconical shape and rotation of said edge of said screw flight of said scroll member sweeps during rotation of said scroll member a volume having a mating frustoconical shape.

3. The centrifuge of claim 2 said scroll member further comprises:
   a plurality of helical screw flights extending outwardly from said tubular side wall between said end wall and said front end of said scroll member, each of said plurality of screw flights having a front surface substantially perpendicular to said axis of rotation,
   a plurality of feed openings, each of said plurality of feed openings located proximate said end wall and displaced above a front surface of one of said plurality of helical screw flights to form a lip between an edge of the feed opening and said front surface of said helical screw flight, and
   a plurality of abrasion resistant inserts, each of said plurality of abrasion resistant inserts recessed in one of said front surfaces of one of said plurality of screw flights, each of said plurality of abrasion resistant inserts having an exposed surface substantially flush with said front surface of said one of said plurality of screw flights.

4. The centrifuge of claim 3 wherein said plurality of feed openings have a rear edge flush with a forward directed surface of said end wall.

5. The centrifuge of claim 4 wherein each of said front surfaces of said plurality of screw flights has a leading edge in close proximity to said inner surface of said circumferential screen of said cage member and each of said abrasion resistant inserts is located proximate said end wall of scroll member and has a width extending generally between said tubular side wall and said leading edge of a corresponding one of said screw flights.

6. The centrifuge of claim 5 wherein the exposed surface of each of said plurality of abrasion resistant inserts has a length approximately equal to one-half of a length of the front surface of each of said plurality of helical screw flights between said front and rear ends of a corresponding one of said scroll members.

7. The centrifuge of claim 6 wherein said plurality of abrasion resistant inserts is ceramic alumina.

8. The centrifuge of claim 6 wherein said plurality of abrasion resistant inserts is tungsten carbide.

9. The centrifuge of claim 7 wherein each of said plurality of screw flights has a pocket for receiving an abrasion resistant insert.

10. A centrifuge of the type having a cage member mounted within a housing to rotate about an axis of rotation, the cage member having a circumferential screen, the centrifuge further having a scroll member mounted within the cage member to rotate about the axis of rotation, the scroll member having a tubular side wall and an end wall extending outwardly from the tubular side wall, the end wall intersecting one end of a screw flight extending helically relative to the axis of rotation between rear and front ends of the scroll member, the screw flight having a leading edge moving in close proximity with the circumferential screen, and the screw flight further having a front surface generally perpendicular to the axis of rotation, the centrifuge further comprising an abrasion resistant material recessed in the front surface of the screw flight, the abrasion resistant material having an exposed surface substantially flush with the front surface of the screw flight.

11. The centrifuge of claim 10 wherein the screw flight extends outwardly from a tubular side wall of the scroll member, and the scroll member has a closed end wall adjacent with and intersecting the screw flight and the tubular side wall, and further wherein the front surface of the screw flight includes a recess for receiving the abrasion resistant material, the recess extending in one direction from approximately the intersection of the screw flight and the tubular side wall to a location proximate to but not including an outwardly directed edge of the screw flight, and the recess extending in another direction from a location proximate the closed end wall to a location including a substantial portion of a length of the screw flight.

12. A centrifuge of the type having a cage member mounted within a housing to rotate about an axis of rotation, the cage member having a circumferential screen, the centrifuge further having a scroll member mounted within the cage member to rotate about the axis of rotation, the scroll member having a tubular side wall and an end wall connected to a rear end of the tubular side wall, the end wall extending from the tubular side wall and intersecting one end of screw flights extending outwardly from the tubular side wall, each of the screw flights further having a front surface generally perpendicular to the axis of rotation, the centrifuge further comprising feed openings located in the tubular side wall adjacent the end wall and a predetermined displacement above the front surface of the screw flights thereby forming a lip between the front surface of each of the screw flights and an edge of a respective one of the feed openings.

13. A centrifuge of the type having a cage member mounted within a housing to rotate about an axis of rotation, the cage member having a circumferential screen, the centrifuge further having a scroll member mounted within the cage member to rotate about the axis of rotation, the scroll member having a tubular side wall and an end wall connected to a rear end of the tubular side wall, the end wall extending outward from the tubular side wall and intersecting one end of screw flights extending outwardly from the tubular side wall, the centrifuge further comprising feed openings located in the rear end of the tubular side wall, each of said feed openings has a rear edge flush with a forward directed surface of said end wall.

14. The centrifuge of claim 1 wherein the front surface of the screw flight having a recess for receiving the abrasion resistant insert, the recess further comprising a periphery approximately bounded by the tubular side wall, the closed end of the cage member, the edge of the helical screw flight and a portion of a length of the front surface of said screw flight.

* * * * *

UNITED STATES PATENT AND TRADEMARK OFFICE
CERTIFICATE OF CORRECTION

PATENT NO. : 5,380,434
DATED : February 13, 1995
INVENTOR(S) : Thomas E. Paschedag It is certified that error appears in the above-indentified patent and that said Letters Patent is hereby corrected as shown below:

Col. 5, line 63, "I10" should be --110--.

Signed and Sealed this

Twenty-third Day of May, 1995

Attest:

Attesting Officer

BRUCE LEHMAN

Commissioner of Patents and Trademarks